Dec. 1, 1925.  1,563,430
C. C. MOORE
HEADLAMP CONTROL DEVICE
Filed March 29, 1924   2 Sheets-Sheet 1
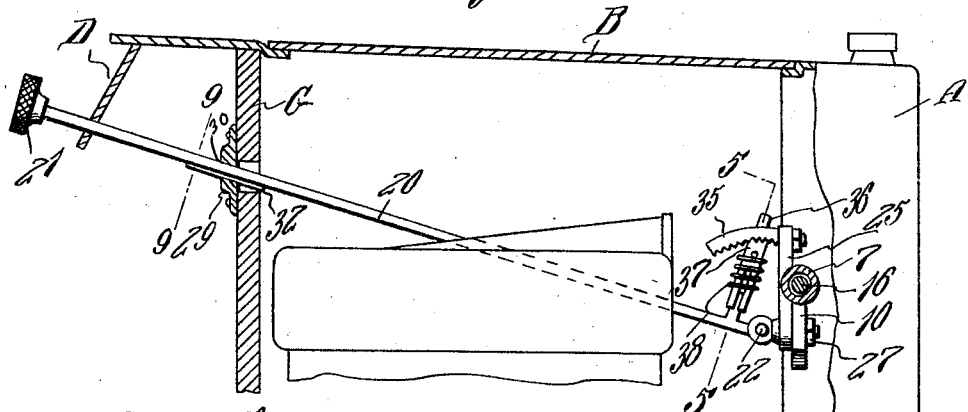
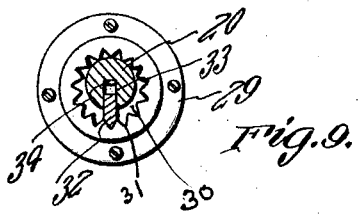
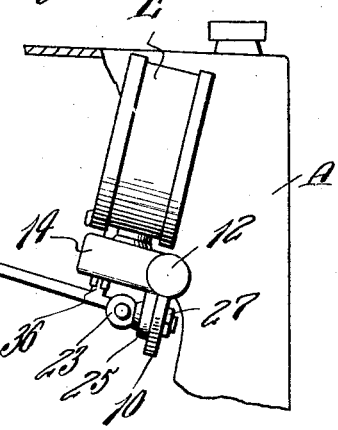
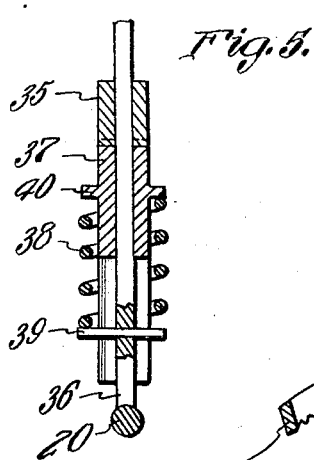
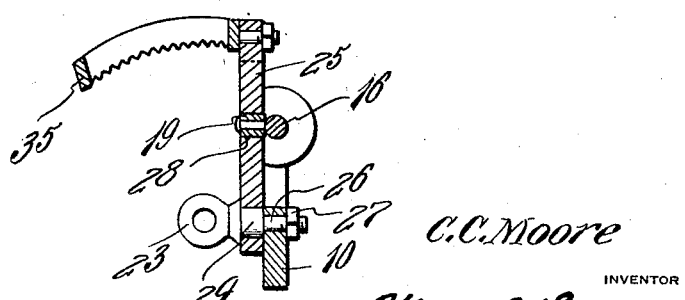
C. C. Moore
INVENTOR
BY Victor J. Evans
ATTORNEY
WITNESS:

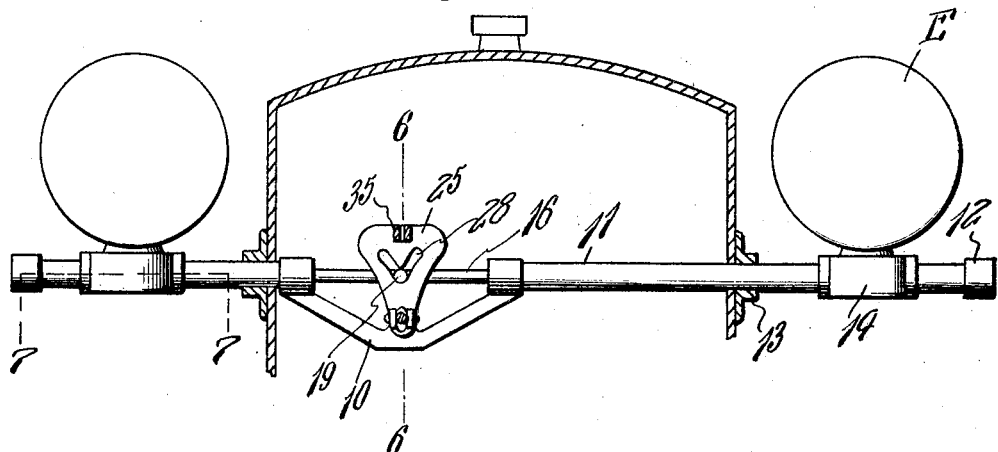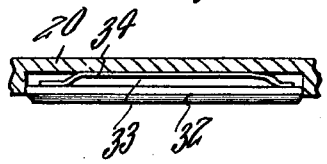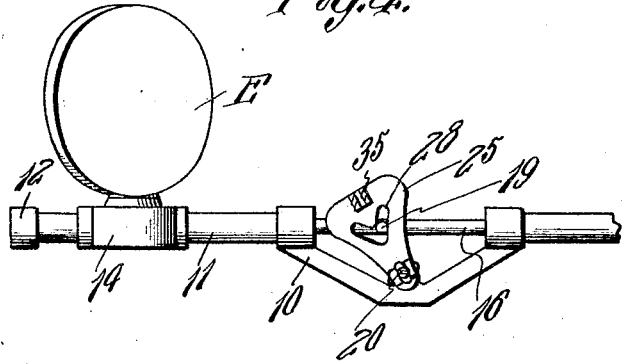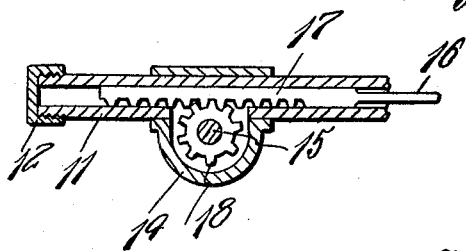

Patented Dec. 1, 1925.

1,563,430

UNITED STATES PATENT OFFICE.

CALVIN C. MOORE, OF STEUBENVILLE, OHIO.

HEADLAMP-CONTROL DEVICE.

Application filed March 29, 1924. Serial No. 702,941.

*To all whom it may concern:*

Be it known that I, CALVIN C. MOORE, a citizen of the United States, residing at Steubenville, in the county of Jefferson and State of Ohio, have invented new and useful Improvements in Headlamp-Control Devices, of which the following is a specification.

This invention relates to motor vehicles, particularly to the headlamp mountings thereof, and has for its object the provision of novel means manually operable by the driver for turning the headlamps at the right or left and for tilting them downwardly to throw the light directly upon the road way and eliminating the glare.

An important object is the provision of a control device embodying a novel mounting for the lamps whereby they will be capable of having the turning and tilting movements as may be required.

Yet another object is the provision of novel automatic means for retaining the parts in any desired adjusted position.

An additional object is the provision of an apparatus of this character which will be simple and inexpensive in manufacture and installation, easy to control, positive in action, efficient and durable in service and a general improvement in the art.

With the above and other objects and advantages in view the invention consists in the details of construction to be hereinafter more fully described and claimed and illustrated in the accompanying drawings, in which:

Figure 1 is a vertical section through the front portion of an automobile illustrating the mounting of my invention, Figure 2 is a fragmentary side elevation showing one of the lamps tilted downwardly, Figure 3 is a cross section through the hood of the vehicle looking forwardly at the backs of the lamps, Figure 4 is a fragmentary view similar to Figure 3 showing the mechanism operated for swinging the lamps laterally, Figure 5 is a detail section on the line 5—5 of Figure 1, Figure 6 is a detail section on the line 6—6 of Figure 3, Figure 7 is a detail section on the line 7—7 of Figure 3, Figure 8 is a detail section through a fragment of the control rod showing the spring pressed catch, Figure 9 is a detail section on the line 9—9 of Figure 1.

Referring more particularly to the drawings the letter A designates the radiator of an automobile, B the hood, C the dash, D the instrument board and E the lamps.

In carrying out my invention I provide an angularly shaped bracket 10 which is located within the hood and which includes oppositely extending arms to which are secured tubular housings 11 which may in actual practice be pipe sections with their outer ends closed by caps 12. These members 11 extend through the sides of the radiator and are journaled in bearings 13 for rocking movement. On the members 11 near the outer ends thereof are bearings 14 for the stems 15 which depend from the lamps E whereby the lamps may be capable of turning to the right or left as the case may be.

Slidable through both members 11 is a rod 16 which has its end portions formed with or carrying racks 17 which mesh with pinions 18 on the stems 15. The rod 16 traverses the bracket 10 and carries a pin 19 for a purpose to be described.

The control means comprises a rod 20 which extends through the dash and instrument board and which is equipped with a knob 21. The rod 20 is pivotally connected at 22 with an eye bolt 23 which has a rectangular shank 24 passing through a segmental shaped plate 25 and which has a reduced threaded extension 26 passing through the bracket 10 and carrying a nut 27. By turning the knob 21 it is apparent that the plate 25 will be rocked to the right or left and that by moving the rod 20 longitudinally the entire bracket 10 may be swung back and forth for rocking the members 11. The plate 25 is formed with a V-shaped slot 28 within which the pin 19 is engaged so that when the plate 25 is swung the rod 16 will be correspondingly shifted.

For holding the rod 20 in a rotatably adjusted position I provide an escucheon plate 29 which is mounted on the dash C and which has an opening 30 at the edge of which are teeth 31 co-operating with a latch bar 32 located within a recess 33 in the rod 20 and urged outwardly by a leaf spring 34. As the rod 20 is turned the latch bar 32 will snap over the teeth 31 and be held thereby against accidental turning movement.

For holding the bracket at an adjusted swung position, I provide a bifurcated segmental arm 35 secured on the plate 25, and also provide a guide rod 36 formed upon the rod 20 and carrying a plunger 37 which is urged upwardly by a coil spring 38 engaging against a transverse pin 39 through the guide rod and against a flange 40 on the plunger.

When it is desired to turn the lamps one way or the other the operator grasps the knob 21 and turns it to the desired extent, whereupon the plate 25 will be swung to the right or left, as the case may be. Owing to the engagement of the V-shaped slot 28 on the pin 19, it is apparent that the rod 16 will be shifted longitudinally and that the racks 17 meshing with the pinions 18 will turn the lamps to a corresponding extent. When it is desired to tilt the lamps downwardly as when approaching another vehicle or when passing through towns where bright lights are prohibited, it is merely necessary that the operator pull upon the rod 20 which will result in tilting the bracket 10 and plate 25 forwardly and downwardly. As the tubular members 11 which carry the lamps are rigid with respect to the bracket, it is obvious that the lamps will be tilted downwardly. The action of the holding means for maintaining the parts in any adjusted position has already been described and further explanation is therefore unnecessary.

While I have shown and described the preferred embodiment of my invention it is of course to be understood that I reserve the right to make such changes in the form, construction and arrangement of parts as will not depart from the spirit of the invention or the scope of the subjoined claim.

I claim:

In a dirigible headlamp device, a bracket carrying tubular housings, headlamps journaled transversely through the housings, a longitudinally movable member slidable through the housings and operatively connected with the headlamps for effecting turning movement thereof from side to side, and an operating rod extending longitudinally with respect to the axis of the vehicle and having a flexible connection with the bracket and a fixed connection with said means for operating the latter, said longitudinally extending member being movable forwardly and rearwardly for tilting the bracket, and means on said longitudinally extending member cooperating with the bracket for maintaining the latter in adjusted position, said named means including an arcuate rack bar carried by the bracket, and a spring pressed latch mounted on the longitudinally extending member cooperating with the rack bar.

In testimony whereof I affix my signature.

CALVIN C. MOORE.